(12) United States Patent
Dubos et al.

(10) Patent No.: US 8,534,331 B2
(45) Date of Patent: Sep. 17, 2013

(54) TIRE CONTAINING LAYERED COMPOSITE OF SEALANT AND AIR PERMEATION RESISTANT FILM

(75) Inventors: Laurent Roger André Dubos, Niederfeulen (LU); Annette Lechtenbochmer, Ettelbruck (LU); Giorgio Agostini, Colmar-Berg (LU); Joseph Alan Incavo, Houston, TX (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 13/323,856

(22) Filed: Dec. 13, 2011

(65) Prior Publication Data

US 2013/0146195 A1 Jun. 13, 2013

(51) Int. Cl.
*B60C 5/00* (2006.01)

(52) U.S. Cl.
USPC ............ 152/158; 152/510; 152/548; 152/564

(58) Field of Classification Search
USPC .................................. 152/158, 510, 548, 564
See application file for complete search history.

(56) References Cited

U.S. PATENT DOCUMENTS

| | | | |
|---|---|---|---|
| 1,239,291 A | 9/1917 | Morse | |
| 2,877,819 A | 3/1959 | Gibbs | |
| 3,048,509 A | 8/1962 | Sweet et al. | |
| 4,140,167 A | 2/1979 | Böhm et al. | 152/346 |
| 4,171,237 A | 10/1979 | Böhm et al. | 156/115 |
| 4,228,839 A | 10/1980 | Böhm et al. | 152/347 |
| 4,246,144 A * | 1/1981 | Girgis | 524/430 |
| 4,895,610 A | 1/1990 | Egan | 156/115 |
| 4,928,741 A | 5/1990 | Rye et al. | 152/504 |
| 5,040,583 A | 8/1991 | Lin et al. | 152/510 |
| 6,011,093 A | 1/2000 | Maly et al. | 524/62 |
| 6,148,885 A | 11/2000 | Spragg et al. | 152/197 |
| 6,159,613 A | 12/2000 | Reilly et al. | 428/492 |
| 6,436,215 B1 | 8/2002 | Spragg et al. | 156/130 |
| 6,837,287 B2 | 1/2005 | Smith, Sr. et al. | 152/503 |
| 6,840,295 B2 | 1/2005 | Ruffa | 152/157 |
| 6,869,666 B2 | 3/2005 | Deeb et al. | 428/212 |
| 6,962,181 B2 | 11/2005 | Deevers et al. | 152/503 |
| 7,730,919 B2 | 6/2010 | Kanenari | 152/510 |
| 7,798,188 B2 | 9/2010 | Sakai et al. | 152/510 |
| 7,905,978 B2 | 3/2011 | Morooka | 156/247 |
| 7,954,528 B2 | 6/2011 | Tsou et al. | 152/510 |
| 7,976,666 B2 | 7/2011 | Morooka | 157/247 |
| 8,021,730 B2 | 9/2011 | Tsou et al. | 428/36.9 |
| 2004/0159386 A1* | 8/2004 | Deevers et al. | 152/503 |
| 2008/0047646 A1 | 2/2008 | Hong et al. | 152/510 |
| 2009/0038727 A1 | 2/2009 | Hong | 152/510 |
| 2009/0078352 A1* | 3/2009 | Majumdar et al. | 152/504 |
| 2010/0175804 A1 | 7/2010 | Lesage et al. | 152/511 |
| 2010/0263778 A1 | 10/2010 | Lesage et al. | 152/511 |
| 2010/0294411 A1 | 11/2010 | Custodero et al. | 152/511 |
| 2011/0056604 A1 | 3/2011 | Sugimoto | 152/510 |

FOREIGN PATENT DOCUMENTS

WO 2011/012699 2/2011

* cited by examiner

*Primary Examiner* — Edward Cain

(74) *Attorney, Agent, or Firm* — Henry C. Young, Jr.

(57) ABSTRACT

The present invention relates to a tire containing a layered composite of sealant and air permeation resistant film, particularly a non-elastomeric film.

20 Claims, 1 Drawing Sheet

TIRE CONTAINING LAYERED COMPOSITE OF SEALANT AND AIR PERMEATION RESISTANT FILM

FIELD OF THE INVENTION

The present invention relates to a tire containing a layered composite of sealant and air permeation resistant film, particularly a non-elastomeric film.

BACKGROUND OF THE INVENTION

Pneumatic rubber tires have been prepared which contain innerliner layers to promote, or retard, resistance to air permeation and have also been prepared which contain a puncture sealant layer.

While, historically, pneumatic tire innerliner layers are often comprised of elastomer(s) which are resistant to air permeation, such as for example butyl and halobutyl rubber, alternative materials are sometimes sought for pneumatic tire innerliner layers.

For example, pneumatic rubber tires have been proposed which contain an air permeation resistant film, or thin layer as a tire innerliner to promote resistance to a somewhat gradual leakage, or permeation, of air contained in the pneumatic tire cavity through and into various rubber components of the tire. Such proposed films may be comprised of, for example, a resin such as a thermoplastic resin which contains a dispersion of elastomeric domains, or particles. For example, see U.S. Pat. Nos. 7,730,919, 7,798,188, 7,905,978, 7,954, 528, 7,976,666 and 8,021,730 and Patent Application Serial Nos. 2008/0047646 and 2009/0038727.

Other candidates for such films have been proposed which are indicated as having a relatively low permeability to air or oxygen including, for example, polyvinylidene chloride, nylon and polyester. See, for example, U.S. Pat. Nos. 5,040, 583 and 4,928,741. Composites containing such film have been proposed comprised of, for example, at least one layer of such film of non-elastomeric material sandwiched between two elastomeric layers of elastomeric compositions.

Various of such films may be also be suitable to promote a degree of physical resistance to tire puncturing objects. However, in general, if such films are positioned on a firm, solid, rubber layer of the tire, their ability to resist penetration by sharp objects (e.g. a nail) pushing from the outside of the tire through its carcass, without unnecessarily fracturing the film is challenged.

In practice, pneumatic rubber tires have also been proposed which contain sealant layers to promote sealing against tire puncturing objects, such as for example a nail, and to promote filling a hole by the sealant which might have been left by the puncturing object such as a nail to thereby maintain a degree of integrity of the surface of the pneumatic tire cavity and to resist air leakage from the tire to the atmosphere. For example, see U.S. Pat. Nos. 6,962,181, 6,840,295, 6,837,287, 4,895,610, 4,228,839, 4,171,237, 4,140,167, 3,048,509, 2,877,819 and 1,239,291.

Additional pneumatic tires have been proposed which contain composites of one or more layers which might promote puncture sealant and penetration resistance. For example, see U.S. Pat. Nos. 6,159,613, 6,148,885, 6,011,093 and 6,840, 295, U.S. Patent Application Serial Nos. 2011/0056604, 2010/0294411, 2010/0175804 and 2010/0263778 and PCT Patent Application No. WO2011/012699.

For this invention, it is proposed to provide a pneumatic rubber tire with a composite comprised of a layered combination of puncture sealant layer and protective air permeation resistant film. In this manner it is envisioned that the relatively soft puncture sealing layer may provide an appropriate backing for the protective film to promote a resistance to its rupturing caused by a penetrating object such as a nail while the layered composite itself promotes a puncture sealing effect for the pneumatic tire.

Accordingly, it is an undertaking of this invention to evaluate providing a beneficial layered composite of sealant and protective film for a pneumatic tire innerliner.

In the description of this invention, the term "phr" is used to designate parts by weight of an ingredient per 100 parts of elastomer unless otherwise indicated. The terms "elastomer" and "rubber" are used interchangeably unless otherwise indicated. The terms "cure" and "vulcanize" are used interchangeably unless otherwise indicated.

SUMMARY AND PRACTICE OF THE INVENTION

In accordance with this invention a pneumatic rubber tire is provided which contains an outer circumferential rubber tread, supporting cord reinforced rubber carcass and innerliner composite where said innerliner composite is comprised of a sealant layer and air permeation resistant film layer;

wherein, for said innerliner composite, its sealant layer is an inner layer of said innerliner composite positioned adjacent to said rubber carcass and said sealant layer supports an air permeation resistant film layer positioned on the outer surface of said sealant layer;

wherein said inner sealant layer is comprised of:
  (A) organoperoxide depolymerized butyl rubber, or
  (B) polyurethane; and
wherein said air permeation resistant film is comprised of thermoplastic material containing a dispersion of elastomer domains;

wherein said thermoplastic material is optionally comprised of a nylon film, wherein said elastomer domains are optionally comprised of at least one of butyl rubber and sulfur curable diene-based elastomer.

In one embodiment, the said air permeation resistant film is also puncture resistant in a sense that it provides a degree of resistance to puncturing by tire puncturing objects (e.g. a nail).

In practice, the said air permeation resistant film is applied to a layer of sealant precursor for said sealant to form a layered composite thereof. The layered composite is applied to an uncured rubber tire assembly, of an uncured tire assembly is applied to said layered composite, to form an assembly thereof, and the assembly cured at an elevated temperature to cure the tire assembly and to degrade the sealant precursor to form a tire innerliner composite of built-in tire sealant layer which contains an air permeation resistant film on its surface.

In one embodiment, said polyurethane sealant layer of said innerliner composite is derived from a polyurethane layer of said innerliner composite in a form of a cast or millable polyurethane, building said innerliner composite with said layer of cast or millable polyurethane into an uncured rubber tire to form an assembly thereof and curing said pneumatic rubber tire at an elevated temperature to convert (e.g. high temperature degrade the polyurethane at tire cure temperature in a range of from about 140° C. to about 170° C.) said cast or millable polyurethane to a polyurethane puncture sealant layer.

In one embodiment, said depolymerized butyl rubber sealant layer of said innerliner composite is derived from a butyl rubber layer of said innerliner composite containing an organoperoxide, building said innerliner composite with said layer of butyl rubber and organoperoxide into an uncured rubber tire to form an assembly thereof and curing said pneumatic rubber tire at an elevated temperature to depolymerize said butyl rubber with said organoperoxide to thereby form a puncture sealant layer thereof.

In one embodiment, said air permeation resistant film contains an adhesive at the interface of said air permeation film and said sealant layer.

In one embodiment, said air permeation resistant film contains an adhesive at the interface of said air permeation film and said sealant layer, wherein said adhesive is an RFL adhesive comprised of a resorcinol-formaldehyde resin/styrene-butadiene vinylpyridine latex or a blend thereof with a styrene-butadiene rubber latex.

The thickness of the sealant layer of said innerliner composite can vary greatly depending somewhat upon the tire, its size and intended service. For example, the thickness of the sealant/penetration layered composite may range from about 0.05 mm to about 2 mm (millimeters).

For the polyurethane sealant layer of the innerliner composite, the polyurethane sealant precursor may be, for example, a cast or millable polyurethane or a sulfur curable diene-containing polyurethane precursor which will degrade within the tire upon curing the tire at an elevated temperature to form a sufficiently tacky mass to seal against a puncturing object such as, for example a nail, and which can flow into a tire puncture hole for a purpose of resisting flow of tire inflation air through the tire puncture and to thereby promote a resistance of the pneumatic tire going flat by loss of tire inflation air. For example, see U.S. Patent Application Serial No. 2009/0078352.

Such polyurethane sealant layers may be formed, for example, by application of a pre-formed solid polyurethane based sealant precursor layer to an uncured rubber tire assembly and curing the tire assembly in a suitable mold at an elevated temperature in which the polyurethane sealant precursor is degraded to form a better built in polyurethane based sealant layer within the tire having tire sealing properties.

Such cast polyurethane precursor may be formed, for example, by spin casting a liquid polyurethane based sealant precursor reaction mixture at form a sheet allowing the liquid sealant precursor reaction mixture to react and create a solid pre-formed polyurethane based sealant precursor.

The cast polyurethane is desirably a self-healing polyurethane elastomeric material, which may be a reaction product of, for example, methylene diphenyl 4,4'-diisocyanate (MDI) and poly(alkylene oxide) glycol. A polyurethane composition for use as the precursor sealant layer may be obtained, for example, from Novex, Inc. of Wadsworth, Ohio, U.S.A. It should be understood that formulations of polyurethane materials that can be used for the self-healing polyurethane composition may be readily produced by persons having ordinary skill in the art from known chemistry techniques in the production of polyurethanes.

Exemplary of sulfur curable diene-based polyurethanes is, for example, 7840TPU™ from Global Specialty Chemicals Manufacturer Sartomer Company, U.S.A.

The thickness of the polyurethane sealant precursor layer can vary in the unvulcanized tire. Generally, the thickness may range, for example, from about 0.13 cm to about 1.9 cm depending somewhat upon the tire itself and its intended use. The built-in sealant layer is usually generally situated in the crown region of the tire.

For the organoperoxide depolymerized butyl rubber sealant, the sealant precursor is provided as a butyl rubber which contains an organoperoxide to cause the butyl rubber to at least partially depolymerize at an elevated tire cure temperature.

Various organoperoxides may be used for the butyl rubber-based sealant precursor. Preferably organoperoxides are used which become active (e.g. generate peroxide free radicals) at high temperatures, that is, for example, above about 100° C. Such organoperoxides are considered herein as being heat activatible organoperoxides. Examples of such organoperoxides are, for example, tertbutyl perbenzoate and dialkyl peroxides with the same or different radicals, such as dialkylbenzene peroxides and alkyl pre-esters. Preferably the active organoperoxide will contain two peroxide groups. Frequently the peroxide groups are attached to a tertiary butyl group. The basic moiety on which the two peroxide groups are suspended can be aliphatic, cycloaliphatic, or aromatic radicals. Some representative examples of such active organoperoxides are, for example, n-butyl 4,4-di-(tert-butylperoxy) valerate, 2,5-bis(t-butyl peroxy)-2,5-dimethyl hexane; 1,1-di-t-butyl peroxi-3,3,5-trimethyl cyclohexane; 2,5-dimethyl-2,5-di(t-butyl peroxy) hexyne-3; p-chlorobenzyl peroxide; 2,4-dichlorobenzyl peroxide; 2,2-bis-(t-butyl peroxi)-butane; di-t-butyl peroxide; benzyl peroxide; 2,5-bis(t-butyl peroxy)-2,5-dimethyl hexane, dicumyl peroxide; and 2,5-dimethyl-2,5-di(t-butyl peroxy) hexane. The n-butyl 4,4-di-(tert-butylperoxy) valerate as well as the dicumylperoxide may be preferred organoperoxides for use in the depolymerizing of the butyl rubber of the butyl rubber containing sealant precursor.

In practice, the organoperoxide depolymerized sealant may optionally also contain one or more of clay and calcium carbonate as well as at least one of carbon black and precipitated silica.

After the unvulcanized pneumatic tire is assembled, the tire is shaped and cured using a normal tire cure cycle. After curing, the pre-formed annular precursor sealant layer is degraded and provides the pneumatic tire with self-sealing properties against various puncturing objects.

By virtue of the foregoing, there is provided a pneumatic tire that has an ability to seal against various tire puncturing objects.

Generally, the tire can be cured over a wide temperature range. For example, passenger tires might be cured at a temperature ranging from about 130° C. to about 170° C. and truck tires might be cured at a temperature ranging from about 150° C. to about 180° C. Thus, a cure temperature may range, for example, from about 130° C. to about 180° C. and for a desired period of time. In one example, the tire assembly is cured in a suitable mold at a temperature in a range of from about 150° C. to about 175° C. for a sufficient period of time to thermally degrade the polyurethane precursor layer to thereby form the seamless built-in sealant layer 20 which has puncture sealing properties.

BRIEF DESCRIPTION OF DRAWING

The FIGS. 1 and 2 (FIG. 1 and FIG. 2) are contained in the accompanying drawing to illustrate embodiments of the invention.

THE DRAWING

Figure 1:
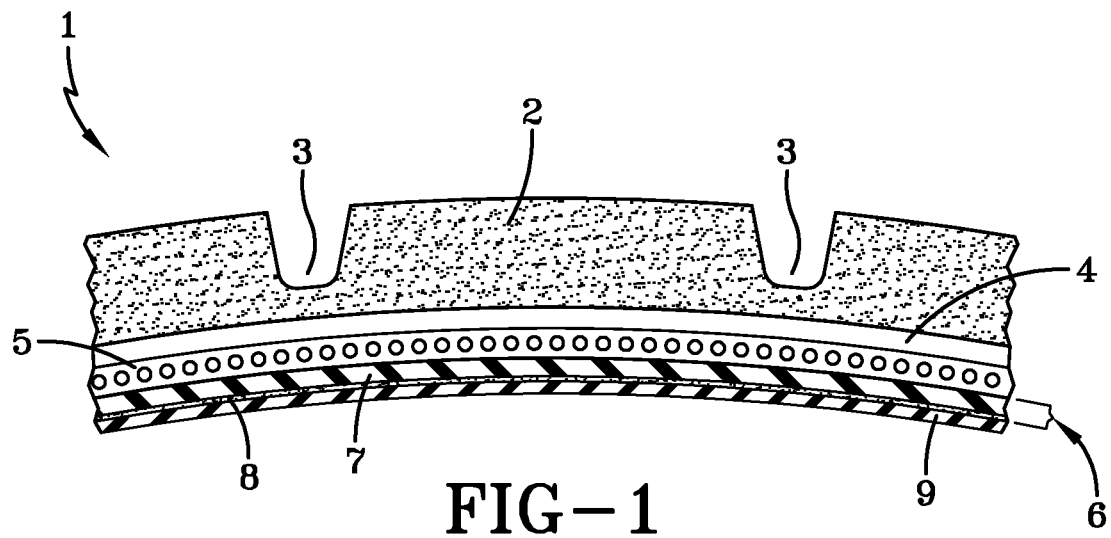
FIG. 1 is a partial cross-section of a pneumatic tire containing a multilayered composite of sealant and film on its inner surface.

In FIG. 1 a tire (1) is presented composed of a circumferential outer tread layer (2) with lugs and grooves (3), an underlying supporting tread base rubber layer (4) together with a cord reinforced rubber carcass ply (5) and a multilayered composite (6) of puncture sealant layer (7) thermoplastic air retention and penetration resistant film (8) and optional tire innerliner rubber layer (9) as an additional air barrier.

The multilayered composite (6) is positioned for the puncture sealant layer (7) to be next to the tire carcass (5), with possibly an intermediate rubber layer therebetween (not shown).

The air retention and puncture resistant film (8) overlays the puncture sealant layer (7) with an optional adhesive coating (not shown) therebetween to aid in adhering the film (8) to the sealant layer (7).

The optional innerliner rubber layer (9) overlays the air retention and penetration resistant film (8) with an optional adhesive coating (not shown) therebetween to aid in adhering the film (8) to the innerliner rubber layer (9).

Figure 2:
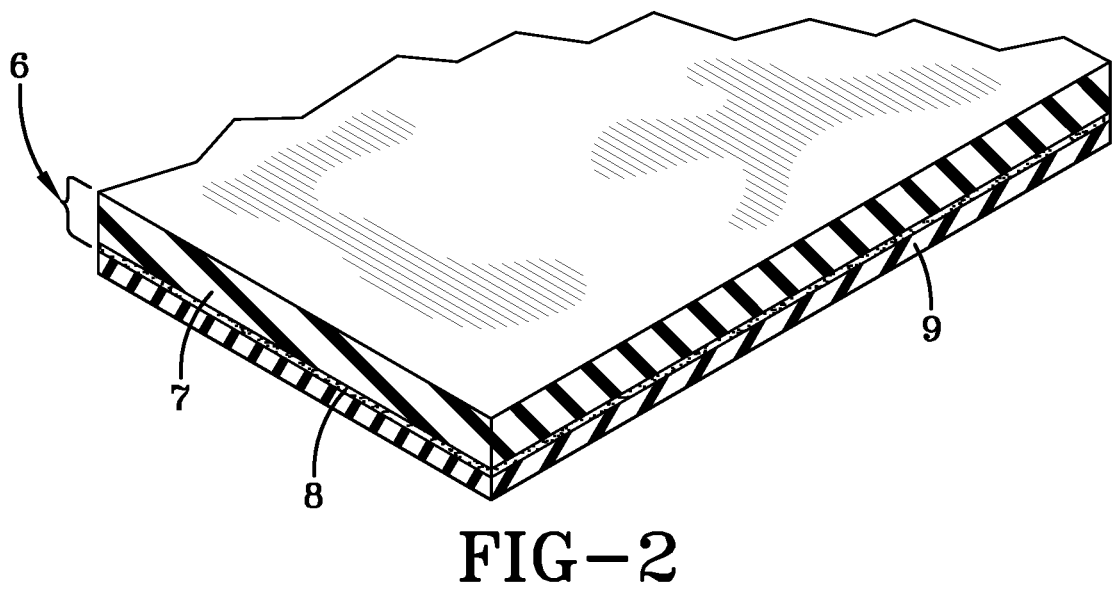
FIG. 2 depicts the multilayered composite of sealant and film for the tire of FIG. 1.

In FIG. 2 the multilayered composite (6) composed of the puncture sealant layer (7), thermoplastic air retention and penetration resistant film (8) together with the innerliner rubber layer (9) is depicted.

For this Drawing, the sealant layer (7) is comprised of an organoperoxide depolymerized butyl rubber or polyurethane polymer and the thermoplastic air retention film (8) is comprised of a thermoplastic resin such as, for example, nylon, containing a dispersed elastomer comprised of domains of butyl rubber. The optional innerliner rubber layer is comprised of a butyl rubber, namely a brominated butyl rubber.

The optional adhesive coating may be, for example, an RFL adhesive. The RFL is typically applied as a water based composite of resorcinol-formaldehyde resin and rubber latex where the latex is typically an elastomeric styrene/butadiene/vinyl pyridine latex and/or elastomeric styrene/butadiene latex. Accordingly, said RFL adhesive may be exclusive of isocynates. The water based RFL adhesive composition is generally applied as a coating (e.g. to a surface of the film) and dried to form the RFL adhesive prior to adhering the film to a substrate (e.g. a sealant precursor).

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire which contains an outer circumferential rubber tread, supporting cord reinforced rubber carcass and innerliner where said innerliner is comprised of a layered composite of sealant and air permeation resistant film layers;
    wherein said innerliner composite is comprised of an inner sealant layer positioned adjacent to said rubber carcass where said sealant layer supports an air permeation resistant film layer on its outer surface;
    wherein said inner sealant layer is comprised of:
    (A) organoperoxide depolymerized butyl rubber, or
    (B) polyurethane, and
    wherein said air permeation resistant film is comprised of a thermoplastic material containing a dispersion of elastomer domains;
    wherein said thermoplastic material is comprised of nylon;
    wherein said elastomer is comprised of at least one of butyl rubber and sulfur curable diene-based elastomer domains.

2. The tire of claim 1 wherein said tire is also puncture resistant in a sense that the air permeation resistant film provides a degree of resistance to puncturing by tire puncturing objects.

3. The pneumatic tire of claim 1 wherein said inner sealant layer of said innerliner composite is comprised of an organoperoxide depolymerized butyl rubber.

4. The pneumatic tire of claim 1 wherein said inner sealant layer of said innerliner composite is comprised of polyurethane.

5. The pneumatic tire of claim 1 wherein said air permeation resistant film is comprised of nylon which contains a dispersion of butyl rubber domains.

6. The pneumatic tire of claim 2 wherein said air permeation resistant film is comprised of nylon which contains a dispersion of butyl rubber domains.

7. The pneumatic tire of claim 3 wherein said air permeation resistant film is comprised of nylon which contains a dispersion of butyl rubber domains.

8. The pneumatic tire of claim 1 wherein said air permeation resistant film is comprised of nylon which contains a dispersion of sulfur curable diene-based elastomer domains.

9. The pneumatic tire of claim 2 wherein said air permeation resistant film is comprised of nylon which contains a dispersion of sulfur curable diene-based elastomer domains.

10. The pneumatic tire of claim 3 wherein said air permeation resistant film is comprised of nylon which contains a dispersion of sulfur curable diene-based elastomer domains.

11. The pneumatic tire of claim 1 wherein said air permeation resistant film contains an adhesive at the interface of said air permeation film and said sealant layer.

12. The pneumatic tire of claim 1 wherein said air permeation resistant film contains an adhesive at the interface of said air permeation film and said sealant layer, wherein said adhesive is an RFL adhesive comprised of a resorcinol-formaldehyde resin/styrene-butadiene vinylpyridine latex or a blend thereof with a styrene-butadiene rubber latex.

13. The pneumatic tire of claim 2 wherein said air permeation resistant film contains an adhesive at the interface of said air permeation film and said sealant layer, wherein said adhesive is an RFL adhesive comprised of a resorcinol-formaldehyde resin/styrene-butadiene vinylpyridine latex or a blend thereof with a styrene-butadiene rubber latex.

14. The pneumatic tire of claim 3 wherein said air permeation resistant film contains an adhesive at the interface of said air permeation film and said sealant layer, wherein said adhesive is an RFL adhesive comprised of a resorcinol-formaldehyde resin/styrene-butadiene vinylpyridine latex or a blend thereof with a styrene-butadiene rubber latex.

15. The pneumatic tire of claim 5 wherein said air permeation resistant film contains an adhesive at the interface of said air permeation film and said sealant layer, wherein said adhesive is an RFL adhesive comprised of a resorcinol-formaldehyde resin/styrene-butadiene vinylpyridine latex or a blend thereof with a styrene-butadiene rubber latex.

16. The pneumatic tire of claim 8 wherein said air permeation resistant film contains an adhesive at the interface of said air permeation film and said sealant layer, wherein said adhesive is an RFL adhesive comprised of a resorcinol-formaldehyde resin/styrene-butadiene vinylpyridine latex or a blend thereof with a styrene-butadiene rubber latex.

17. The pneumatic tire of claim 1 wherein said polyurethane sealant layer of said innerliner composite is derived from a polyurethane layer of said innerliner composite in a form of a cast or millable polyurethane, building said innerliner composite with said layer of cast or millable polyurethane into an uncured rubber tire to form an assembly thereof and curing said pneumatic rubber tire at an elevated temperature to convert said cast or millable polyurethane to a polyurethane puncture sealant layer.

18. The pneumatic tire of claim 1 wherein said depolymerized butyl rubber sealant layer of said innerliner composite is derived from a butyl rubber layer of said innerliner composite containing an organoperoxide, building said innerliner composite with said layer of butyl rubber and organoperoxide into an uncured rubber tire to form an assembly thereof and curing said pneumatic rubber tire at an elevated temperature to depolymerize said butyl rubber with said organoperoxide to thereby form a puncture sealant layer thereof.

19. The pneumatic tire of claim 1 wherein said depolymerized butyl rubber sealant layer of said innerliner composite is derived from a butyl rubber layer of said innerliner composite containing an organoperoxide, building said innerliner composite with said layer of butyl rubber and organoperoxide into an uncured rubber tire to form an assembly thereof and curing said pneumatic rubber tire at an elevated temperature to depolymerize said butyl rubber with said organoperoxide to thereby form a puncture sealant layer thereof, and wherein said air permeation resistant film contains an adhesive at the interface of said air permeation film and said sealant layer.

20. The pneumatic tire of claim 1 wherein said depolymerized butyl rubber sealant layer of said innerliner composite is derived from a butyl rubber layer of said innerliner composite containing an organoperoxide, building said innerliner composite with said layer of butyl rubber and organoperoxide into an uncured rubber tire to form an assembly thereof and curing said pneumatic rubber tire at an elevated temperature to depolymerize said butyl rubber with said organoperoxide to thereby form a puncture sealant layer thereof, and wherein said air permeation resistant film contains an adhesive at the interface of said air permeation film and said sealant layer, wherein said adhesive is an RFL adhesive comprised of a resorcinol-formaldehyde resin/styrene-butadiene vinylpyridine latex or a blend thereof with a styrene-butadiene rubber latex.

* * * * *